United States Patent
Eggenhaus et al.

(10) Patent No.: US 9,220,195 B2
(45) Date of Patent: Dec. 29, 2015

(54) COMBINE HARVESTER COMPRISING A SPREADING DEVICE FOR SPREADING CHOPPED CROP, AND METHOD OF OPERATING SAME

(75) Inventors: Georg Eggenhaus, Saerbeck (DE); Stefan Teroerde, Warendorf (DE); Joachim Baumgarten, Beelen (DE); Christopher Vieregge, Doerentrup (DE); Christoph Heitmann, Warendorf (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 563 days.

(21) Appl. No.: 13/323,901

(22) Filed: Dec. 13, 2011

(65) Prior Publication Data

US 2012/0178509 A1 Jul. 12, 2012

(30) Foreign Application Priority Data

Jan. 7, 2011 (DE) .......................... 10 2011 000 057

(51) Int. Cl.
 *A01F 12/40* (2006.01)
 *A01D 41/12* (2006.01)
 *A01D 41/127* (2006.01)

(52) U.S. Cl.
 CPC .......... *A01D 41/1243* (2013.01); *A01D 41/127* (2013.01)

(58) Field of Classification Search
 CPC ............ A01D 41/1243; A01D 41/127; A01D 41/1274; A01D 41/1276; A01F 29/12; A01F 12/40

USPC .................. 460/111–113, 901, 1; 56/10.2 R, 56/DIG. 15
See application file for complete search history.

(56) References Cited

U.S. PATENT DOCUMENTS

| | | | | |
|---|---|---|---|---|
| 5,569,081 A | * | 10/1996 | Baumgarten et al. | 460/112 |
| 6,682,416 B2 | * | 1/2004 | Behnke et al. | 460/114 |
| 6,688,972 B2 | * | 2/2004 | Buermann et al. | 460/112 |
| 6,840,853 B2 | * | 1/2005 | Foth | 460/111 |
| 7,086,942 B2 | * | 8/2006 | Niermann et al. | 460/111 |
| 7,306,174 B2 | | 12/2007 | Pearson et al. | |
| 7,467,997 B2 | * | 12/2008 | Niermann et al. | 460/111 |
| 7,487,024 B2 | * | 2/2009 | Farley et al. | 701/50 |
| 8,010,262 B2 | * | 8/2011 | Schroeder et al. | 701/50 |
| 8,428,829 B2 | * | 4/2013 | Brunnert et al. | 701/50 |
| 8,475,248 B2 | * | 7/2013 | Farley | 460/111 |

(Continued)

FOREIGN PATENT DOCUMENTS

| | | | | |
|---|---|---|---|---|
| EP | 1 570 726 | | 9/2005 | |
| JP | 05236819 A | * | 9/1993 | A01D 69/00 |

OTHER PUBLICATIONS

Claas, "Lexion 500 Series Rotary and Straw Walker Combines", Jan. 2010, pp. 18-20, 25, and 26.*

*Primary Examiner* — Thomas B Will
*Assistant Examiner* — Joan D Misa
(74) *Attorney, Agent, or Firm* — Michael J. Striker

(57) ABSTRACT

A combine harvester has a spreading device for spreading chopped crop, a control device to which the spreading device is connected and which controls spreading properties of the spreading device, and a wind anemometer located on either side of the spreading device in a rear region of the combine harvester and producing a signal corresponding to a characteristic of wind.

6 Claims, 3 Drawing Sheets

(56) References Cited

U.S. PATENT DOCUMENTS

| | | | |
|---|---|---|---|
| 8,924,030 B2 * | 12/2014 | Wendte et al. | 700/283 |
| 2002/0073675 A1 * | 6/2002 | Buermann et al. | 56/255 |
| 2002/0083695 A1 * | 7/2002 | Behnke et al. | 56/119 |
| 2008/0245042 A1 * | 10/2008 | Brunnert et al. | 56/10.2 F |
| 2013/0095899 A1 * | 4/2013 | Knapp | 460/111 |

* cited by examiner

COMBINE HARVESTER COMPRISING A SPREADING DEVICE FOR SPREADING CHOPPED CROP, AND METHOD OF OPERATING SAME

CROSS-REFERENCE TO RELATED APPLICATION

The invention described and claimed hereinbelow is also described in German Patent Application DE 10 2011 000 057.7 filed on Jul. 1, 2011. This German Patent Application, whose subject matter is incorporated here by reference, provides the basis for a claim of priority of invention under 35 U.S.C. 119(a)-(d).

BACKGROUND OF THE INVENTION

The present invention relates to a combine harvester comprising a spreading device for spreading chopped crop. The present invention further relates to a method for operating a control device for controlling a chopped-material spreading device.

EP 1 570 726 B1 makes known a combine harvester comprising a spreading device for delivering chopped crop residue, which can be driven at a variable speed. To attain a consistent distribution width, the drive that drives the spreading device is controlled by a control device. The control device comprises sensors which monitor the environmental conditions in order to control the consistent distribution of the chopped crop by the spreading device. To this end, a sensor for detecting the cross-wind speed is provided, which detects same during operation of the combine harvester. On the basis of the cross-wind speed that was registered, the control device calculates a compensation in order to adapt the drive speed of the spreading device to the environmental conditions. The placement of the cross-wind sensor is selected to be above the cab roof, on the grain tank of the combine harvester, to expose it fully to the wind.

A proven disadvantage of the placement of a wind anemometer above the grain tank is that the cross-wind conditions registered there do not correspond to the actual cross-wind conditions in the region of the spreading device in which the chopped crop is delivered.

SUMMARY OF THE INVENTION

The problem addressed by the present invention is that of overcoming the disadvantages of the prior art and achieving a spreading of the crop on the ground that is adapted to the particular circumstances.

Advantageous developments are the subject matter of the dependent claims.

According to the invention, a wind anemometer is located in the rear region of the combine harvester, on both sides of the spreading device. The placement of two wind anemometers on both sides and, preferably, opposite one another, has the advantage that the influence that a shielding of the wind by the combine harvester on one of the two sides of the combine harvester can have on the wind anemometer is minimized. By placing the wind anemometer in the rear region of the combine harvester, measurement signals are generated that correspond to the cross-wind conditions in the immediate vicinity of the spreading device. A further advantage of this position results from the simplified retrofittability of a combine harvester, without it being necessary to engage in the basic structure.

In particular, the two wind anemometers can be disposed in a common horizontal plane on the combine harvester. When one of the two wind anemometers is shielded, on either side, by the combine harvester itself, e.g. after travel across the headland, the same measurement conditions are always retained, regardless of which of the two measuring devices is shielded by the combine harvester since, in general, at least one of the two wind anemometers is located on the side of the combine harvester facing the wind.

In a preferred development, the two wind anemometers can be positioned above the spreading device and below a horizontal plane which delimits the combine harvester in the vertical direction, preferably below the plane of the grain tank cover or below a substantially horizontally extending refueling pipe.

Preferably, the wind anemometers can each comprise a plate which is suspended in a manner that permits swiveling about a horizontal axis, the wind-induced deflection of which can be registered.

The particular wind anemometer can comprise an angular-position sensor which registers the deflection of the plate. Preferably, the angular-position sensor can be in the form of a rotary potentiometer.

In particular, the deflection of the plate can be limited by end stops, to prevent the plate from over-rotating about the horizontal axis. The deflection is limited by an amount of approximately 45°.

The invention further relates to a method for operating a control device for controlling a chopped-material spreading device, in the case of which a default setting for the control of the spreading device is specified. The default setting includes the specification, by an operator, of the spreading direction, the spreading width and the distance to the crop edge.

A further problem addressed by the invention is that of providing a method for operating a control device for controlling a chopped-material spreading device, which accounts for external influences on the process of cross-wind detection.

According to the inventive method, signals that represent the wind direction and the wind force are generated by way of two wind anemometers, and are compared to one another by the control device, and the signal having a greater signal intensity is used by the control device for controlling the spreading device in order to adapt the default position to changing spreading conditions. In this manner, a signal that represents the actual cross-wind conditions is provided when one of the two wind anemometers is shielded, even partially, by the combine harvester, in order to control the spreading device.

Preferably, the signal used for control can be amplified by a variably settable amplification factor. This amplification factor serves to override the preset default setting of the spreading properties, such as spreading direction, spreading width or distance from the crop edge, and to account for the slant of the combine harvester during the active harvesting process, in order to adapt the spreading direction of the spreading device accordingly.

To this end, the amplification factor can be set depending on crop properties. Crop properties can include the type of crop, the moisture level or the crop height. The influence of the crop height, in particular, becomes clear when harvesting corn, for example, in which the influence of cross wind is negligible due to the crop height of the corn to be harvested, since the spreading device is shielded by the crop. In such a case, the spreading width would not need to be overridden if a cross wind would occur. In contrast, travel along an incline would be taken into account, and so the spreading direction is adapted accordingly.

The amplification factor can be selected or readjusted by an operator of the combine harvester on the basis of a visual inspection of the spreading result that was attained.

To enable compensation for interferences such as machine vibrations or sudden deflections caused by extreme fluctuations of the terrain, the sensor signals can be smoothed by the control device by way of a mean value filter before comparison with one another.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
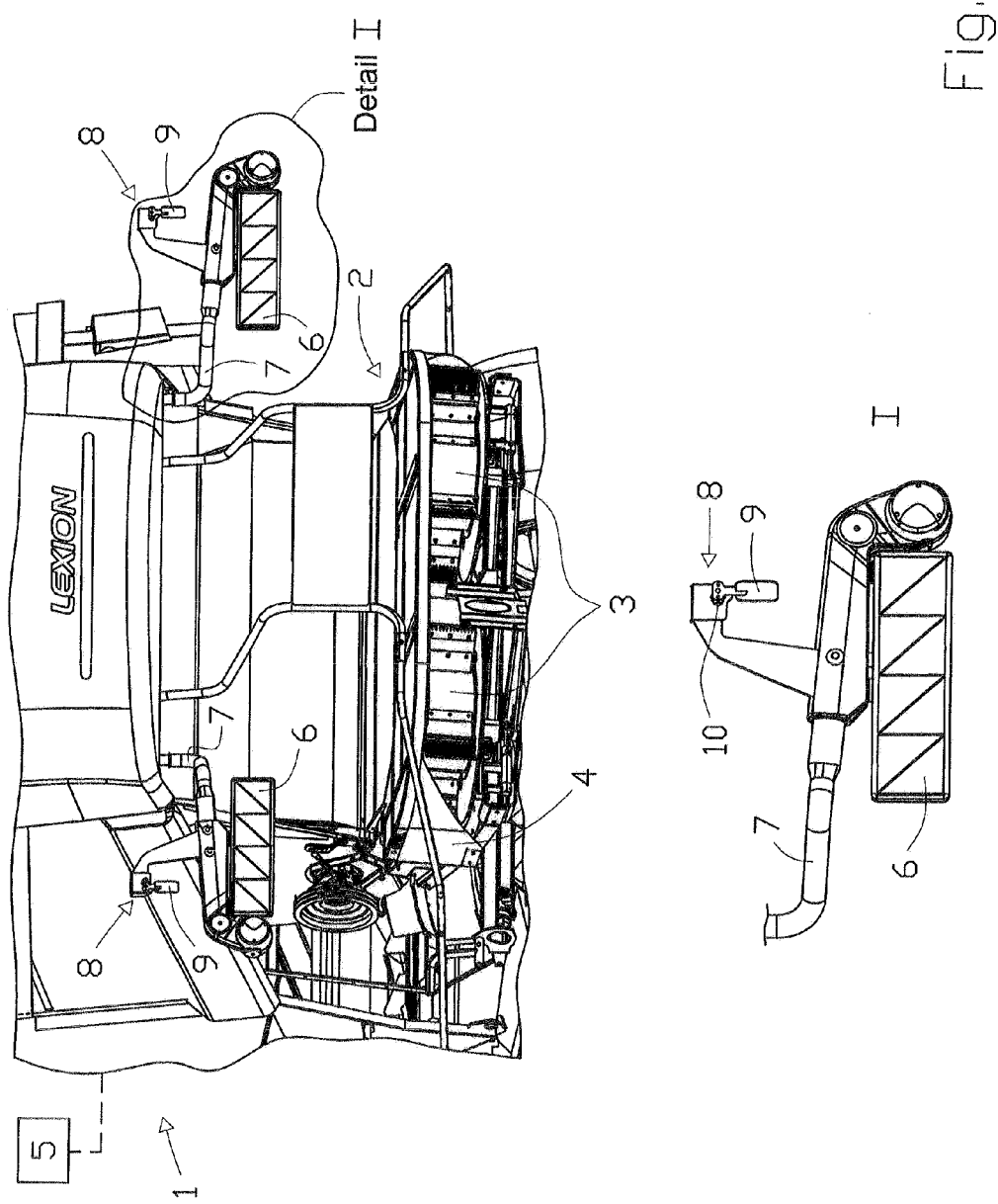
FIG. 1 a partial view of the back side of a combine harvester in a first embodiment of the present invention.

The depiction in FIG. 1 shows a partial view of the back side of a combine harvester 1, which is known per se and is therefore not depicted in greater detail, comprising a spreading device 2 with which chopped crop is delivered.

The spreading device 2 located in the rear region of the combine harvester 1 comprises two blowers 3 mounted on a frame 4 outside of a chopper housing. A control device 5 which is indicated merely schematically in FIGS. 1 and 2 is connected to the spreading device 2 in order to control the spreading width of the spreading device 2 by way of the drives and/or guide elements thereof.

Above the spreading device 2, on both sides of the combine harvester 1 and in the rear region thereof, rear lights 6 are located on swivel arms 7 which extend transversely to the direction of travel of the combine harvester 1. In addition, a wind anemometer 8 is located on each swivel arm 7, which preferably lie in a common horizontal plane. The wind anemometers 8 are located opposite one another on the combine harvester 1, on either side of the spreading device 2. Each wind anemometer 8 is designed as a swivelably suspended plate 9 which is supported such that it can swivel about a horizontal axis which extends substantially parallel to the direction of travel, and which is deflected by cross winds, as depicted in the detailed view I. The deflection of the plate 9 is registered by an angular-position sensor 10 which is preferably in the form of a rotary potentiometer. To prevent over-rotation of the plate 9, the deflection of the plate 9 is limited by end stops preferably to an angular amount of approximately 45'.

In the same manner, a slant of the combine harvester 1 that occurs during the harvesting process can also be registered by the wind anemometer 8 since this also induces deflection of the plate 9.

Figure 2:
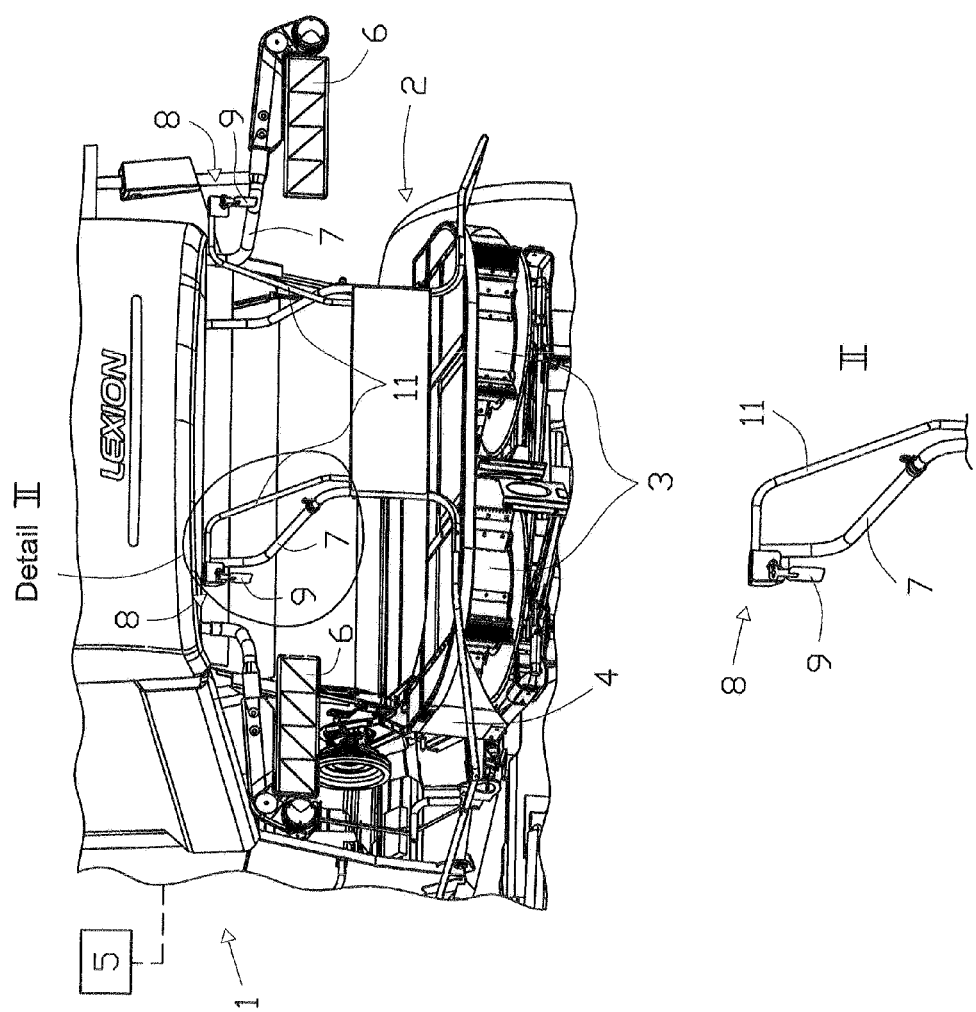
FIG. 2 a partial view of the back side of a combine harvester in a second embodiment of the present invention.

The depiction in FIG. 2 shows a second embodiment of a combine harvester 1. The placement of the angular-position measuring device 8 take place by way of a separate retaining device 10 which can likewise be attached to the combine harvester 1 in the rear region of the combine harvester 1 above the spreading device 2. The two embodiments depicted in FIGS. 1 and 2 allow simple retrofittability of the wind anemometers 8 on a combine harvester 1.

The control device 5 can comprise a separate display and input unit which is preferably located in the cab of the combine harvester 1, or can be connected to an external display and input unit in the cab, to allow specification of a default setting for the control of the spreading device 2. The default setting is entered by the operator of the combine harvester 1, in that he enters crop-specific information by way of the input unit into the control device 1, such as the crop type and moisture level, as well as the spreading width, which is dependent, in general, upon the width of the front attachment, and the spreading width and the distance from the crop edge to be maintained. The drive and/or the guide elements of the spreading device 2 are controlled depending on this default setting in order to attain an even distribution of the chopped crop on the ground.

The two wind anemometers 8 located on either side of the spreading device 2 deliver a signal S1, S2, respectively, which represent the intensity and the direction of the cross wind, wherein the signal amplitudes of the signals S1, S2 can have different levels due, for example, to the shielding of the combine harvester 1. To minimize the influence of the wind shielding by the combine harvester 1 on the registration of the cross wind by the wind anemometers 8, only the signal S1, S2 having the higher signal amplitude is used by the control device 5 to control the spreading device 2 in order to adapt the default setting of the spreading device 2 to changing spreading conditions due to the cross wind or a change in the tilt of the combine harvester 1.

To account for the actual cross-wind conditions, the signal S1, S2 of the wind anemometer 8 to be taken into consideration is acted upon by a variable amplification factor VF. To this end, the driver has the option of selecting the amplification factor VF himself by way of the input and display device in order to override the default setting by a magnitude of his choosing, after performing a visual inspection of the spreading result. The value 1 is specified as the lowest amplification factor VF, which can be varied steplessly or preferably in discrete steps. The value of the amplification factor VF is substantially dependent upon crop-specific properties.

By way of the selection of the amplification factor VF, the crop type, the moisture level of the crop, as well as the crop height of the crop to be harvested are taken into account. For instance, it is known that moist crop is heavier than drier crop, and so a greater amplification factor VF is selected to compensate for the cross wind, in order to attain a consistent spreading width and distance from the crop edge under given cross-wind conditions. If the crop height is considered a crop-specific property, then the crop height of wheat is much lower than that of corn, and so the influence of cross wind is negligible when harvesting corn as compared to wheat due to the shielding of the spreading device 2 by the corn crop.

Figure 3:
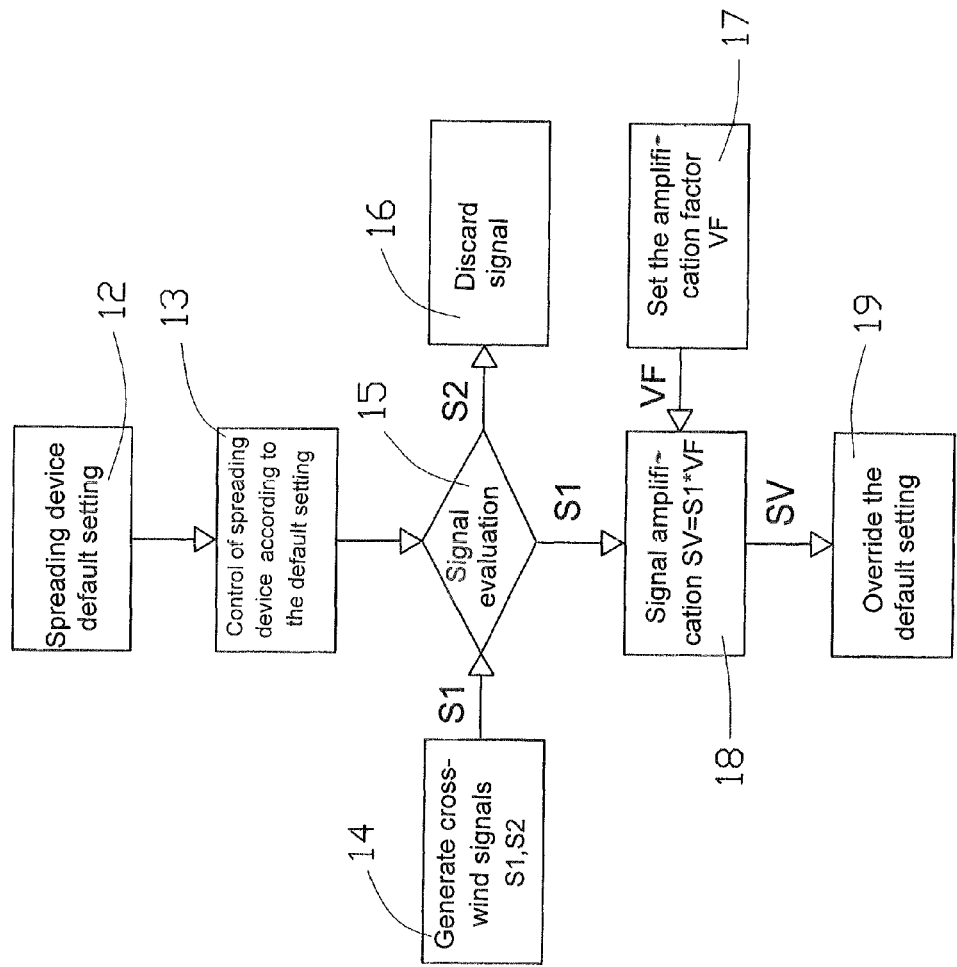
FIG. 3 a flow chart of a process for operating a control device of the present invention.

FIG. 3 depicts a method for operating the control device 5. In a first method step 12, the default setting for control of the spreading device 2 is entered. In this step, the operator specifies the spreading width to be attained, which is dependent, in general, upon the width of the front attachment, as well as the spreading direction and the distance from the crop edge to be maintained.

In a subsequent, second method step 13, the spreading device 2 is controlled in accordance with the default setting, and the harvesting process is started.

In a third method step 14, signals S1, S2 representing the intensity and direction of the cross wind are generated by both wind anemometers 8 and forwarded to the control device 5. It evaluates, in a fourth method step 15, the signal intensity of the two signals S1 and S2, and decides, on the basis of the difference in signal intensity, which of the two signals S1, S2 will be used further or which signal S1, S2 will be discarded in the fifth method step 16.

In a sixth method step 17, the spreading result is checked, e.g. by way of a visual inspection of the chopped crop that was delivered, which the operator can perform. Automation of the inspection of spreading results is likewise feasible, if optical sensors are utilized for this purpose. On the basis of the visual inspection, the operator decides which amplification factor VF should be used to amplify the signal S1 in order to compensate for the influences by cross winds and/or an existing slant if the combine harvester 1 is in a tilted position when the chopped crop is delivered by the spreading device 2. To this end, the operator sets the amplification factor VF in the sixth method step 17.

The stronger signal S1, which is selected in the method step 15, is acted upon in a seventh method step 18 by the amplification factor VF set in the sixth method step 17, and is superposed upon the default setting which was present in the first method step 12. In an eighth method step 19, the spreading device 2 is controlled accordingly using a spreader control signal VS which results from the default setting entered in the first method step 12 and the signal S1 amplified by the amplification factor VF.

It will be understood that each of the elements described above, or two or more together, may also find a useful application in other types of constructions and methods differing from the types described above.

While the invention has been illustrated and described as embodied in a device for combine harvester comprising a spreading device for spreading chopped crop, and method of operating same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A combine harvester, comprising:
   a spreading device for spreading chopped crop;
   a control device to which said spreading device is connected and which controls spreading properties of said spreading device according to a specified default control setting;
   first and second wind anemometers located respectively on either side of the spreading device, in a rear region of the combine harvester;
   wherein the first wind anemometer generates a first signal (S1), the second wind anemometer generates a second signal (S2) and each of the first and second signals (S1, S2) represent both a wind direction and a wind force of a cross wind; and
   wherein the control device compares the first and the second signals (S1, S2) are to one another and uses one of the first and second signals (S1, S2) determined to have a greater signal intensity to control the spreading device to adapt the default control setting to changing spreading conditions.

2. The combine harvester as defined in claim 1, wherein the first and the second wind anemometers are positioned above said spreading device and below a vertically delimiting horizontal plane, the vertically delimiting horizontal plane being substantially coplanar with a plane of the ground upon which the combine harvester is positioned or traveling and which delimits the combine harvester in a vertical direction.

3. The combine harvester as defined in claim 2, wherein the first and the second wind anemometers are located in a common horizontal plane of the combine harvester that is located between, and is substantially in parallel with, the plane of the ground and the vertically delimiting horizontal plane.

4. The combine harvester as defined in claim 3, wherein the first and the second wind anemometers each comprise a plate suspended swivelably about a horizontal axis that extends substantially in parallel to the direction of travel.

5. The combine harvester as defined in claim 4, wherein each of the first and the second wind anemometers has an angular-position sensor which registers a deflection of said plate.

6. The combine harvester as defined in claim 5, further comprising end stops limiting the deflection of said plate.

* * * * *